United States Patent
Zhang et al.

(10) Patent No.: US 8,934,721 B2
(45) Date of Patent: Jan. 13, 2015

(54) MICROSCOPIC VISION MEASUREMENT METHOD BASED ON ADAPTIVE POSITIONING OF CAMERA COORDINATE FRAME

(75) Inventors: Guangjun Zhang, Beijing (CN); Zhenzhong Wei, Beijing (CN); Weixian Li, Beijing (CN); Zhipeng Cao, Beijing (CN); Yali Wang, Beijing (CN)

(73) Assignee: Beihang University, Beijing (CN)

( * ) Notice: Subject to any disclaimer, the term of this patent is extended or adjusted under 35 U.S.C. 154(b) by 108 days.

(21) Appl. No.: 13/696,982

(22) PCT Filed: Apr. 25, 2011

(86) PCT No.: PCT/CN2011/073276
§ 371 (c)(1),
(2), (4) Date: Nov. 8, 2012

(87) PCT Pub. No.: WO2011/160491
PCT Pub. Date: Dec. 29, 2011

(65) Prior Publication Data
US 2013/0058581 A1  Mar. 7, 2013

(30) Foreign Application Priority Data
Jun. 23, 2010 (CN) .......................... 2010 1 0207245

(51) Int. Cl.
G06K 9/36 (2006.01)
*G01B 11/00* (2006.01)
G02B 21/36 (2006.01)
*G02B 21/22* (2006.01)

(52) U.S. Cl.
CPC ............ *G01B 11/005* (2013.01); *G02B 21/365* (2013.01); *G02B 21/22* (2013.01)
USPC ............................ 382/201; 382/276; 356/359

(58) Field of Classification Search
USPC ......... 382/201, 181, 209, 218, 299, 255, 264, 382/265, 285, 276; 356/359
See application file for complete search history.

(56) References Cited

U.S. PATENT DOCUMENTS

| 7,164,472 B2 | 1/2007 | Dorrance et al. |
| 7,453,559 B2 | 11/2008 | Dorrance et al. |

(Continued)

FOREIGN PATENT DOCUMENTS

| CN | 1566900 A | 1/2005 |
| CN | 101055177 A | 10/2007 |

(Continued)

OTHER PUBLICATIONS

International Search Report in international application No. PCT/CN2011/073276, mailed on Aug. 11, 2011.

(Continued)

*Primary Examiner* — Sheela Chawan
(74) *Attorney, Agent, or Firm* — Oppedahl Patent Law Firm LLC (57) ABSTRACT

The present disclosure provides a microscopic vision measurement method based on the adaptive positioning of the camera coordinate frame which includes: calibrating parameters of a microscopic stereo vision measurement model (201); acquiring pairs of synchronical images and transmitting the acquired images to a computer through an image acquisition card (202); calculating 3D coordinates of feature points in a scene according to the matched pairs of feature points in the scene obtained from the synchronical images and the calibrated parameters of the microscopic stereo vision measurement model (203); and performing specific measurement according to the 3D coordinates of the feature points in the scene (204). With the method, the nonlinearity of the objective function in the microscopic vision calibration optimization is effectively decreased and a better calibration result is obtained.

5 Claims, 7 Drawing Sheets

(56) References Cited

U.S. PATENT DOCUMENTS

| | | | |
|---|---|---|---|
| 7,616,254 B2* | 11/2009 | Wong et al. | 348/349 |
| 7,929,801 B2* | 4/2011 | Nakamura et al. | 382/285 |
| 7,990,462 B2* | 8/2011 | Wong et al. | 348/353 |
| 8,194,995 B2* | 6/2012 | Wong et al. | 382/255 |
| 8,280,194 B2* | 10/2012 | Wong et al. | 382/299 |
| 8,446,667 B2* | 5/2013 | Smith et al. | 359/385 |
| 2004/0263956 A1* | 12/2004 | Ishii | 359/368 |
| 2005/0078304 A1 | 4/2005 | Dorrance et al. | |
| 2008/0298673 A1 | 12/2008 | Zhang et al. | |

FOREIGN PATENT DOCUMENTS

| | | |
|---|---|---|
| CN | 101373135 A | 2/2009 |
| CN | 101876533 A | 11/2010 |
| DE | 19525561 C2 | 10/2003 |
| DE | 102007024638 A1 | 1/2008 |

OTHER PUBLICATIONS

English Translation of the Written Opinion of the International Search Authority in international application No. PCT/CN2011/073276, mailed on Aug. 11, 2011.

A Camera Self-calibration Method Based on Coplanar Circles, Dec. 2009.

Study on Camera Calibration and Stereo Reconstruction in Micro-stereo Vision System Chinese Doctoral Dissertations & Master's Theses Full-text Database (Master), Sep. 2004.

G. Danuser, "Photogrammetric calibration of a stereo light microscope", Journal of Microscopy, vol. 193, Pt 1, Jan. 1999, pp. 62-83.

Wu et al., "A Novel Calibration Method for Large-Scale Stereo Vision Sensor based on One-dimensional Target", Oct. 2008. (6 pages).

Carsten Steger, "Unbiased Extraction of Curvilinear Structures from 2D and 3D Images", May 1998. (195 pages).

Zhengyou Zhang, "A Flexible New Technique for Camera Calibration", Technical Report MSR-TR-98-71, Microsoft Research, Microsoft Corporation, Dec. 2, 1998. (22 pages).

Douglas M. Bates and Donald G. Watts, "Nonlinear Regression Analysis and Its Applications", Second edition, John Wiley & Sons, Inc., New York, NY, Oct. 1988. (102 pages).

\* cited by examiner

Table 1

| No. | Distance error | No. | Distance error |
|---|---|---|---|
| 1 | 0.52μm | 6 | 0.29μm |
| 2 | 0.44μm | 7 | 0.37μm |
| 3 | 0.30μm | 8 | 0.46μm |
| 4 | 0.41μm | 9 | 0.24μm |
| 5 | 0.28μm | 10 | 0.35μm |
| RMS: 0.37μm | | | |

Fig. 11

Table 2

| No. | Distance error | No. | Distance error |
|---|---|---|---|
| 1 | 0.78μm | 6 | 0.87μm |
| 2 | 0.81μm | 7 | 0.89μm |
| 3 | 0.83μm | 8 | 0.79μm |
| 4 | 0.82μm | 9 | 0.91μm |
| 5 | 0.87μm | 10 | 0.88μm |
| RMS: 0.85μm | | | |

MICROSCOPIC VISION MEASUREMENT METHOD BASED ON ADAPTIVE POSITIONING OF CAMERA COORDINATE FRAME

TECHNICAL FIELD

The disclosure relates to microscopic vision measurement technology, and especially to a microscopic vision measurement method based on adaptive positioning of camera coordinate frame.

BACKGROUND

With the development of high-resolution optoelectronic imaging devices and high-performance computers in the last two decades, traditional microscopic measurement mainly based on optomechanics has developed into microscopic vision measurement characterized by automatic imaging in high resolution and rapid processing in real time. Microscopic vision measurement technology, with its rapid, accurate and automatic imaging and analysis, has been widely applied in geometric metrology of tiny biological organs and small industrial workpieces, and also applied in visual guidance in cell injection and Micro Electro Mechanical System (MEMS) microoperation.

Precision of microscopic vision measurement, which is highly demanded for the development and manufacture of micro elaborate assembly, is the main concerned problem in actual applications. It is difficult to perform microscopic vision measurement calibration due to the narrow depth of field in microscopic optics, which has become a hot research issue at home and abroad. For example, Danuser ("Photogrammetric calibration of a stereo light microscope", Journal of Microscopy, Vol. 193, 6283, 1999) proposed a measurement model for a stereo light microscope, assuming some of model parameters are true (for example, the principal point and the distance $2b$ between baselines of left and right parallel light paths). Bundle adjustment method was applied for calibration based on 3D target constructed by a high-precision mobile platform, and a measurement precision of 0.25% laterally and 0.60% axially in the magnification of 6.6× can be achieved in the distance measurement. However, the precision of the above microscopic vision measurement is apparently inferior to that of conventional vision measurement which could be higher than 0.05‰. For example, Wu et al ("A Novel Calibration Method for Large-Scale Stereo Vision Sensor based on One-dimensional Target", 7th International Symposium on Instrumentation and Control Technology, Proceedings of SPIE, Vol. 7129, 2008: 71290K) developed a large-scale binocular vision measurement system based on unconstraint 1D target, which could even achieve a precision of 0.04‰ in distance measurement.

Compared with the precision of conventional vision measurement, the precision of microscopic vision measurement is still inferior, which is mainly caused by its low calibration precision. Due to the strong nonlinearity of the optimization objective function in calibration, optimization is sensitive to initial values, therefore when initial values are ill-defined, which is the exact case in microscopic vision measurement where closed-form solutions are inaccurately derived in the narrow depth of field with the image plane approximately parallel to the target plane, it is difficult for a function with the closed-form solution as an initial value to converge to the global optimal value, sometimes the parameter to be calibrated is even an imaginary point.

SUMMARY

In view of the above problem, the disclosure aims to provide a high-precision microscopic vision measurement method based on adaptive positioning of a camera coordinate frame. In the method, a microscopic vision measurement model is established by adaptively moving the camera coordinate frames along their optical axes using a stereo vision microscope and left and right cameras, and the nonlinearity of the objective function in microscopic vision calibration optimization is decreased, then by moving the planar target freely in the field of view, a high-precision calibration of microscopic vision in the narrow depth of field is achieved and the high-precision measurement of a microscopic vision system is eventually realized.

To achieve the above purpose, the technical solution of the present disclosure is realized as follows.

The disclosure provides a microscopic vision measurement method based on adaptive positioning of a camera coordinate system, which includes:

Step A: acquiring pairs of synchronical images and transmitting the acquired images to a computer through an image acquisition card;

Step B: calculating 3D coordinates of feature points in a scene according to the matched pairs of feature points in the scene obtained from the synchronical images and the calibrated parameters of a microscopic stereo vision measurement model; and Step C: performing specific measurement according to the 3D coordinates of the feature points in the scene.

Wherein the method may further include: calibrating the microscopic stereo vision measurement model based on adaptive positioning of the camera coordinate system before executing the Step B, the calibration may include:

Step a: setting up left and right microscopic vision measurement models by adaptively moving left and right camera coordinate frames along their own optical axes respectively, and establishing structural relation between the left and right microscopic vision measurement models;

Step b: placing a planar target randomly in at least three positions in measurement space, shooting the planar target by left and right cameras to get pairs of target images, and setting up a world coordinate system according to position of the planar target;

Step c: extracting coordinates of calibration points in the target images;

Step d: calibrating the parameters of the left and right microscopic vision measurement models respectively;

Step e: optimizing all the calibrated parameters of the microscopic stereo vision measurement model.

Wherein the Step a may further include:

assuming $o_{cl}$ is an optical center of a left microscopic vision system and a left optical axis and a left camera image plane $\pi_{ul}$, intersect at a principal point $o_{pl}$, setting up a 2D left image coordinate frame $o_l$–$u_l v_l$ with a top left point on $\pi_{ul}$ as its origin, and setting up a left camera right-handed coordinate frame $o_{dl}$–$x_{dl} y_{dl} z_{dl}$ with $o_{dl}$ in the left optical axis as its origin, $o_{dl} x_{dl}//o_l u_l$, $o_{dl} y_{dl}//o_l v_l$ and $o_{cl} o_{dl}=d_l$; assuming $o_{cr}$ is an optical center of a right microscopic vision system and a right optical axis and a right camera image plane $\pi_{ur}$ intersect at a principal point $o_{pr}$, setting up a 2D right image coordinate frame $o_r$–$u_r v_r$ with a top left point on $\pi_{ur}$ as its origin, and setting up a right camera right-handed coordinate frame $o_{dr}$–

$x_{dr}y_{dr}z_{dr}$ with $o_{dr}$ in the right optical axis as its origin, $o_{dr}x_{dr}//o_ru_r$, $o_{dr}y_{dr}//o_rv_r$ and $o_{cr}o_{dr}=d_r$; and assuming $o_w-x_wy_wz_w$ is the world coordinate frame;

assuming a 3D point Q has coordinates of $X_w=[x_w, y_w, z_w, 1]^T$ in the world coordinate frame, coordinates of $X_{dl}=[x_{dl}, y_{dl}, z_{dl}]^T$ in the left camera coordinate frame and coordinates of $X_{dr}=[x_{dr}, y_{dr}, z_{dr}]^T$ in the right camera coordinate frame, then transformations among the coordinates are expressed as follows: $X_{dl}=R_w^{dl}X_w+T_w^{dl}$, $X_{dr}=R_w^{dr}X_w+T_w^{dr}$ and $X_{dr}=RX_{dl}+T$, wherein $R_w^{dl}$ and $T_w^{dl}$ are a 3×3 rotation matrix and a 3×1 translation vector in the transformation from $o_w-x_wy_wz_w$ to $o_{dl}-x_{dl}y_{dl}z_{dl}$, $R_w^{dr}$ and $T_w^{dr}$ are a 3×3 rotation matrix and a 3×1 translation vector in the transformation from $o_w-x_wy_wz_w$ to $o_{dr}-x_{dr}y_{dr}z_{dr}$, R and T are a 3×3 rotation matrix and a 3×1 translation vector in the transformation from $o_{dl}-x_{dl}y_{dl}z_{dl}$ to $o_{dr}-x_{dr}y_{dr}z_{dr}$, and R and T are also structure parameters of the microscopic stereo vision measurement model;

assuming image coordinates of left and right light path image points $q_l$ and $q_r$ of the 3D point Q are $[u_l, v_l]^T$ and $[u_r, v_r]^T$ respectively, then an ideal projection transformation of the microscopic stereo vision measurement model based on adaptive positioning of a camera coordinate frame is as follows:

$$\xi_l \begin{bmatrix} u_l \\ v_l \\ 1 \end{bmatrix} = \begin{bmatrix} s_l\alpha_l & 0 & u_{0l}/d_l & u_{0l} \\ 0 & \alpha_l & v_{0l}/d_l & v_{0l} \\ 0 & 0 & 1/d_l & 1 \end{bmatrix} \begin{bmatrix} x_{dl} \\ y_{dl} \\ z_{dl} \\ 1 \end{bmatrix};$$

$$\xi_r \begin{bmatrix} u_r \\ v_r \\ 1 \end{bmatrix} = \begin{bmatrix} s_r\alpha_r & 0 & u_{0r}/d_r & u_{0r} \\ 0 & \alpha_r & v_{0r}/d_r & v_{0r} \\ 0 & 0 & 1/d_r & 1 \end{bmatrix} \begin{bmatrix} x_{dr} \\ y_{dr} \\ z_{dr} \\ 1 \end{bmatrix}$$

where $\xi_l$ and $\xi_r$ are proportionality coefficients, $s_l$ and $s_r$ are left and right camera image scale factors respectively, $[u_{0l}, v_{0l}]^T$ and $[u_{0r}, v_{0r}]^T$ are coordinates of the principal points of left and right cameras respectively, $d_l$ and $d_r$ are positioning offsets of the left and right camera coordinate frames respectively, $\alpha_l$ and $\alpha_r$ are left and right adaptive magnifications respectively;

considering primary and secondary radial distortions of lens, and assuming coordinates of actual image points $q_{distl}$ and $q_{distr}$ corresponding to ideal points $q_l$ and $q_r$ are $[u_{distl}, v_{distl}]^T$ and $[u_{distr}, v_{distr}]^T$, then transformation from ideal image coordinates to actual image coordinates is as follows:

$$\begin{cases} u_{distl} = (u_l - u_{0l})(1 + k_{1l}r_l^2 + k_{2l}r_l^4) + u_{0l} \\ v_{distl} = (v_l - v_{0l})(1 + k_{1l}r_l^2 + k_{2l}r_l^4) + v_{0l}; \end{cases}$$

$$\begin{cases} u_{distr} = (u_r - u_{0r})(1 + k_{1r}r_r^2 + k_{2r}r_r^4) + u_{0r} \\ v_{distr} = (v_r - v_{0r})(1 + k_{1r}r_r^2 + k_{2r}r_r^4) + v_{0r} \end{cases}$$

where $r_l^2=(u_l-u_{0l})^2+(v_l-v_{0l})^2$, $r_r^2=(u_r-u_{0r})^2+(v_r-v_{0r})^2$, $k_{1l}$, $k_{2l}$ and $k_{1r}$, $k_{2r}$ are primary and secondary radial distortion coefficients of left and right cameras respectively;

in summary, parameters of the established microscopic stereo vision measurement model based on adaptive positioning of the camera coordinate frame include:

intrinsic parameters: $s_l$, $s_r$, $[u_{0l}, v_{0l}]^T$, $[u_{0r}, v_{0r}]^T$, $d_l$, $d_r$, $\alpha_l$, $\alpha_r$, $k_{1l}$, $k_{2l}$, $k_{1r}$, $k_{2r}$;

structure parameters: R, T;

extrinsic parameters: $R_w^{dl}$, $T_w^{dl}$.

Wherein the Step b may further include:

setting a planar target with a preset array of black circular spots, wherein a total number of circular spots is 40~100, a radius of the circular spot is 0.01~0.08 mm, vertical and horizontal spacing is 0.01~0.5 mm, a positioning precision is 0.15~3 μm, and a center of the circular spot is taken as the calibration point;

moving the planar target at least three positions non-horizontally in a field of view with a narrow depth of field, and shooting the planar target by left and right cameras respectively at each position to get pairs of target images;

setting up the world coordinate system $o_w-x_wy_wz_w$ with $o_w-x_wy_w$ on the target plane, and obtaining world coordinates of all the calibration points.

Wherein the Step c may further include:

extracting sub-pixel image coordinates of points at edges of the circular spots in the target image, then performing ellipse fitting to points at edges of the circular spots to calculate the centers of the circular spots, taking the extracted centers of the circular spots as the calibration points, and making image coordinates of the calibration points correspond to world coordinates of the calibration points.

Wherein calibrating parameters of the left microscopic vision measurement model in the Step d may further include:

Step d1: setting an interval $[\alpha_{min}, \alpha_{max}]$ with system optical magnification as the center, and setting $\alpha_0=\alpha_{min}$, i=1;

Step d2: setting $\alpha_l=\alpha_0$;

Step d3: calculating closed-form solutions of remaining intrinsic and extrinsic parameters according to image coordinates and world coordinates of the extracted calibration points;

Step d4: optimizing intrinsic and extrinsic parameters for an objective function by minimizing an image reprojection error using Levenberg-Marquardt Algorithm according to the image coordinates and world coordinates of the extracted calibration points in the case where the close-form solutions are taken as initial values and $k_{1l}=k_{2l}=0$ is set, and recording optimization result as the $i^{th}$ result set;

Step d5: setting $\alpha_0=\alpha_0+\Delta\alpha$, wherein $\Delta\alpha$ is step size, if there is $\alpha_0\in[\alpha_{min}, \alpha_{max}]$, then there is i=i+1, and turning to Step d2; otherwise, turning to Step d6;

Step d6: selecting an optimal value of i result sets to be a calibration result, and ending the calibration;

the nonlinear optimization problem aiming at minimizing the image reprojection error for the objective function is $$\min_{\theta_q} \Delta q^T \Delta q$$

where the vector function $\Delta q$ is a column vector consisting of image reprojection errors generated by all the calibration points, which has a component of $\Delta q=|\hat{q}_{distl}-q_{distl}|_2$, here, $\hat{q}_{distl}$ is the image coordinates of the calibration points extracted according to the Step c, and $q_{distl}$ is distorted image coordinates of the calibration points calculated according to the left microscopic vision measurement model, and there is $\theta_q\{s_l, u_{0l}, v_{0l}, d_l, k_{1l}, k_{2l}, R_w^{dl}, T_w^{dl}\}$.

Wherein the Step e may further include:

calculating the structure parameters of the microscopic stereo vision measurement model according to the structural relation between the left and right microscopic vision measurement models, then optimizing all the parameters for the objective function by minimizing an error of distance between any two points;

the nonlinear optimization problem aiming at minimizing the error of distance between any two points for the objective function is $$\min_{\theta_D} \Delta D^T \Delta D$$

where the vector function $\Delta D$ is a column vector consisting of an error of distance between any two points from all calibration points, which has a component of $\Delta D=|\hat{D}_{ij}-D_{ij}|$, $i \neq j$, here, $\hat{D}_{ij}$ is a true distance between the $i^{th}$ calibration point and $j^{th}$ calibration point, and $D_{ij}$ is the distance between the $i^{th}$ calibration point and $j^{th}$ calibration point which is calculated based on the microscopic stereo vision measurement model, and there is $\theta_D = \{s_l, u_{0l}, v_{0l}, d_l, k_{1l}, k_{2l}, R_w^{dl}, T_w^{dl}, s_r, u_{0r}, v_{0r}, d_r, k_{1r}, k_{2r}, R, T\}$.

The microscopic vision measurement method based on adaptive positioning of the camera coordinate frame provided in the disclosure has the following advantages:

the optimal position of the camera coordinate frame along the microscopic vision optical axis is obtained by adaptively moving the camera coordinate frame along the optical axis, the nonlinearity of the objective function in the microscopic vision calibration optimization is decreased and the sensitivity to initial values is reduced in the optimization. Therefore, a better calibration result is obtained and the high-precision measurement of a microscopic vision system is eventually realized.

DETAILED DESCRIPTION

The method of the disclosure will be further illustrated in detail with reference to the drawings in combination with embodiments of the disclosure.

Figure 1:
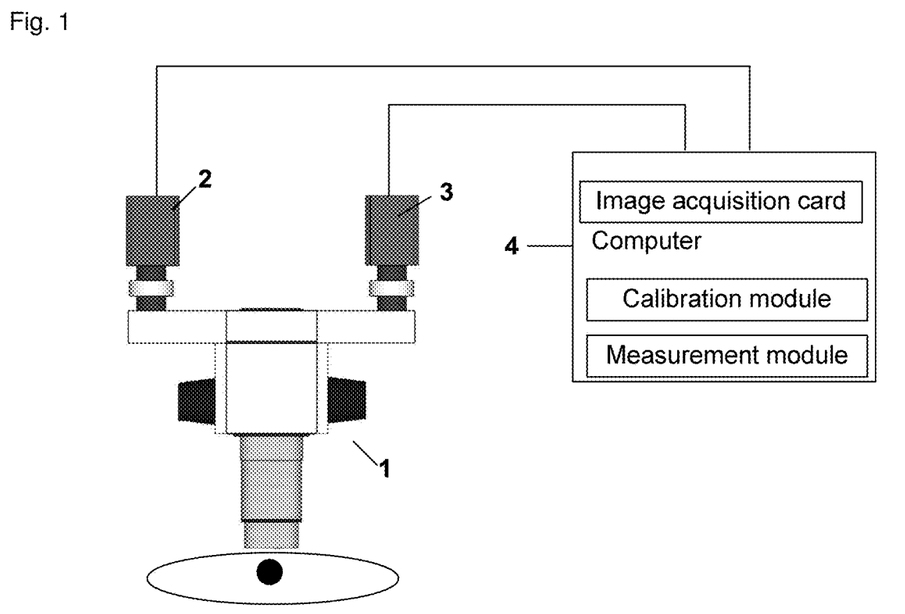
FIG. 1 is a diagram illustrating the structure of a microscopic vision measurement system according to an embodiment of the disclosure.

FIG. 1 shows an embodiment of a microscopic vision measurement system provided by the disclosure, the microscopic vision measurement system in the embodiment includes a vision sensor and a computer. The vision sensor includes a stereo vision microscope 1, a left camera 2 and a right camera 3. The computer 4 includes an image acquisition card, a calibration module and a measurement module. Wherein the calibration module is configured to calibrate parameters of the microscopic stereo vision measurement model using a planar target placed freely in the limited depth of field, and the measurement module is configured to reconstruct 3D coordinates of scene features and perform specific measurement using correctly matched pairs of right and left image feature points according to the microscopic stereo vision measurement model.

Figure 2:
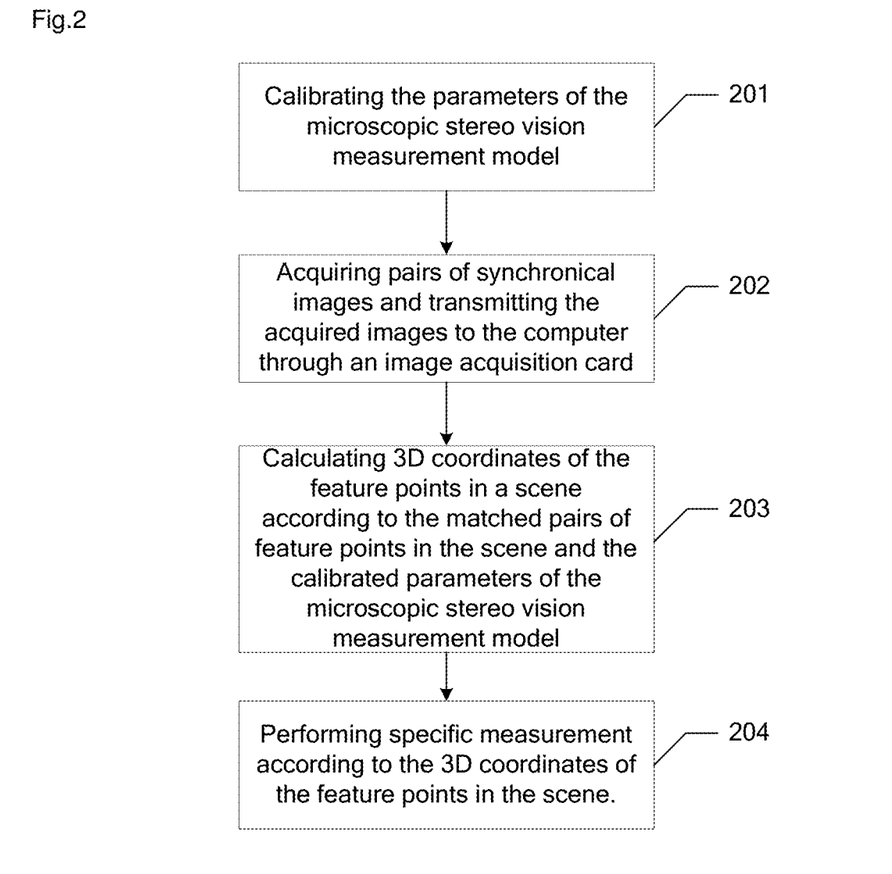
FIG. 2 is a flow chart illustrating a microscopic vision measurement method according to an embodiment of the disclosure.

As shown in FIG. 2, the microscopic vision measurement method provided by the embodiment of the disclosure includes the following steps.

Step 201: calibrating the parameters of the microscopic stereo vision measurement model.

The calibration process of the microscopic stereo vision measurement model based on the adaptive positioning of the camera coordinate frame is described in detail below.

Step 201a: setting up the left and right microscopic vision measurement models by adaptively moving the left and right camera coordinate frame along their own optical axes respectively, and establishing the structural relation between the left and right microscopic vision measurement models, that is, establishing the structure parameters of the transformation from the left camera coordinate frame to the right camera coordinate frame.

Figure 3:
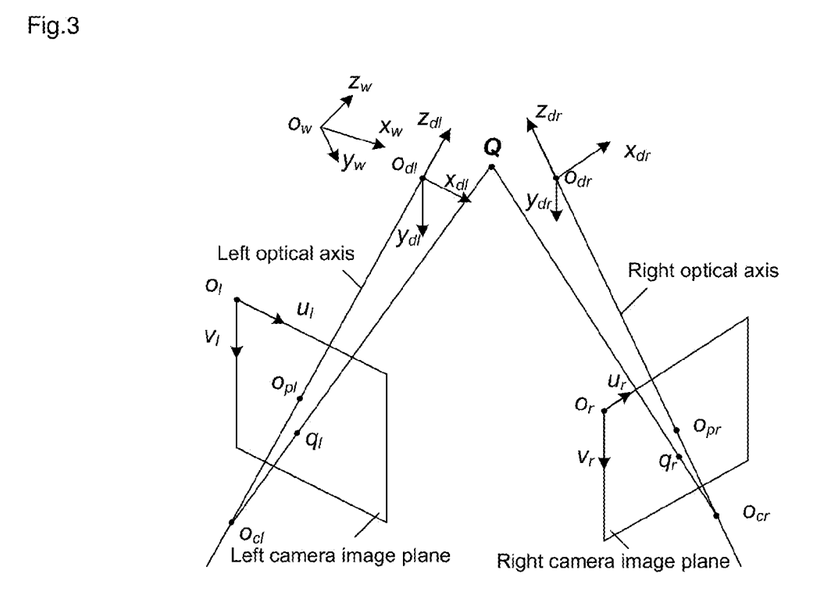
FIG. 3 is a diagram illustrating the imaging model of microscopic stereo vision measurement based on adaptive positioning of the camera coordinate frame.

FIG. 3 is a diagram illustrating the imaging model of the microscopic stereo vision measurement based on adaptive positioning of the camera coordinate frame. As shown in FIG. 3, $o_{cl}$ is the optical center of the left microscopic vision system, the left optical axis and the left camera image plane $\pi_{ul}$ intersect at the principal point $o_{pl}$; the 2D left image coordinate frame $o_l-u_l v_l$, with the top left up point on $\pi_{ul}$ as its origin is set up; and the left camera right-handed coordinate frame $o_{dl}-x_{dl}y_{dl}z_{dl}$, with $o_{dl}$ in the left optical axis as its origin, $o_{dl}x_{dl}//o_l u_l$, $o_{dl}y_{dl}//o_l v_l$ and $o_{cl}o_{dl}=d_l$ is set up. $o_{cr}$ is the optical center of the right microscopic vision system, the right optical axis and the right camera image plane $\pi_{ur}$ intersect at the principal point $o_{pr}$; the 2D right image coordinate frame $o_r-u_r v_r$ with the top left point on $\pi_{ur}$ as its origin, is set up; and the right camera right-handed coordinate frame $o_{dr}-x_{dr}y_{dr}z_{dr}$, with $o_{dr}$ in the right optical axis as its origin, $o_{dr}x_{dr}//o_r u_r$, $o_{dr}y_{dr}//o_r v_r$ and $o_{cr}o_{dr}=d_r$ is set up. $o_w-x_w y_w z_w$ is assumed to be the world coordinate frame.

It is assumed that a 3D point Q has the coordinates of $X_w=[x_w, x_w, z_w, 1]^T$ in the world coordinate frame, the coordinates of $X_{dl}=[x_{dl}, y_{dl}, z_{dl}]^T$ in the left camera coordinate frame and the coordinates of $X_{dr}=[x_{dr}, y_r, z_{dr}]^T$ in the right camera coordinate frame, then the transformations among the coordinates can be expressed as follows:

$$X_{dl}=R_w^{dl}X_w+T_w^{dl}$$

$$X_{dr}=R_w^{dr}X_w+T_w^{dr} \quad (1)$$

$$X_{dr}=RX_{dl}+T \quad (2)$$

where $R_w^{dl}$ and $T_w^{dl}$ are the 3×3 rotation matrix and 3×1 translation vector in the transformation from $o_w-x_wy_wz_w$ to $o_{dl}-x_{dl}y_{dl}z_{dl}$, $R_w^{dr}$ and $T_w^{dr}$ are the 3×3 rotation matrix and 3×1 translation vector in the transformation from $o_w-x_wy_wz_w$ to $o_{dr}-x_{dr}y_rz_{dr}$, and T are the 3×3 rotation matrix and 3×1 translation vector in the transformation from $o_{dl}-x_{dl}y_{dl}z_{dl}$ to $o_{dr}-x_{dr}y_{dr}z_{dr}$, and R and T are the structure parameters of the microscopic stereo vision measurement model.

It is assumed that image coordinates of left and right light path image points $q_l$ and $q_r$ of the 3D point Q are $[u_l, v_l]^T$ and $[u_r, v_r]^T$ respectively, then the ideal projection transformation of the microscopic stereo vision measurement model based on adaptive positioning of the camera coordinate frame is as follows:

$$\xi_l \begin{bmatrix} u_l \\ v_l \\ 1 \end{bmatrix} = \begin{bmatrix} s_l\alpha_l & 0 & u_{0l}/d_l & u_{0l} \\ 0 & \alpha_l & v_{0l}/d_l & v_{0l} \\ 0 & 0 & 1/d_l & 1 \end{bmatrix} \begin{bmatrix} x_{dl} \\ y_{dl} \\ z_{dl} \\ 1 \end{bmatrix}; \quad (3)$$

$$\xi_r \begin{bmatrix} u_r \\ v_r \\ 1 \end{bmatrix} = \begin{bmatrix} s_r\alpha_r & 0 & u_{0r}/d_r & u_{0r} \\ 0 & \alpha_r & v_{0r}/d_r & v_{0r} \\ 0 & 0 & 1/d_r & 1 \end{bmatrix} \begin{bmatrix} x_{dr} \\ y_{dr} \\ z_{dr} \\ 1 \end{bmatrix}$$

where $\xi_l$ and $\xi_r$ are proportionality coefficients, $s_l$ and $s_r$ are the left and right camera image scale factors respectively, $[u_{0l}, v_{0l}]^T$ and $[u_{0r}, v_{0r}]^T$ are the coordinates of the principal points of the left and right cameras respectively, $d_l$ and $d_r$ are the positioning offsets of the left and right camera coordinate frames respectively, $\alpha_l$ and $\alpha_r$ are the left and right adaptive magnifications respectively.

Considering the primary and secondary radial distortions of the lens, and assuming the coordinates of actual image points $q_{distl}$ and $q_{distr}$ corresponding to ideal points $q_l$ and $q_r$ are $[u_{distl}, v_{distl}]^T$ and $[u_{distr}, v_{distr}]^T$, then the transformation from the ideal image coordinates to the actual image coordinates is as follows:

$$\begin{cases} u_{distl} = (u_l - u_{0l})(1 + k_{1l}r_l^2 + k_{2l}r_l^4) + u_{0l} \\ v_{distl} = (v_l - v_{0l})(1 + k_{1l}r_l^2 + k_{2l}r_l^4) + v_{0l}; \end{cases} \quad (4)$$

$$\begin{cases} u_{distr} = (u_r - u_{0r})(1 + k_{1r}r_r^2 + k_{2r}r_r^4) + u_{0r} \\ v_{distr} = (v_r - v_{0r})(1 + k_{1r}r_r^2 + k_{2r}r_r^4) + v_{0r} \end{cases}$$

where $r_l^2=(u_l-u_{0l})^2+(v_l-v_{0l})^2$, $r_r^2=(u_r-u_{0r})^2+(v_r-v_{0r})^2$, $k_{1l}$, $k_{2l}$ and $k_{1r}$, $k_{2r}$ are the primary and secondary radial distortion coefficients of left and right cameras respectively.

According to the above equations (1)~(4), parameters of the microscopic stereo vision measurement model based on the adaptive positioning of the camera coordinate frame include:

intrinsic parameters: $s_l$, $s_r$, $[u_{0l}, v_{0l}]^T$, $[u_{0r}, v_{0r}]^T$, $d_l$, $d_r$, $d_r$, $\alpha_l$, $\alpha_r$, $k_{1l}$, $k_{2l}$, $k_{1r}$, $k_{2r}$;

structure parameters: R, T;

extrinsic parameters: $R_w^{dl}$, $T_d^{dl}$.

Step 201b: placing a planar target randomly in at least three positions in measurement space, shooting the planar target by left and right cameras to get pairs of target images, and setting up the world coordinate frames according to the position of the planar target.

In this step, a planar target with a preset array of black circular spots is set. The total number of circular spots is 40~100, the radius of the circular spot is 0.01~0.08 mm, the vertical and horizontal spacing is 0.01~0.5 mm, and the positioning precision is 0.15~3 μm. The center of the circular spot is taken as the calibration point, the shape of the calibration point of the planar target can be square or other shapes.

The planar target is moved at least three positions non-horizontally in the field of view with narrow depth of field, and the planar target is shot by left and right cameras respectively at each position to get pairs of target images.

The world coordinate frame $o_w-x_wy_wz_w$ is set up with $o_w-x_wy_w$ on the target plane, and the world coordinates of all the calibration points are obtained.

Step 201c: extracting the coordinates of calibration points in the target images.

In this step, the sub-pixel image coordinates of points at edges of the circular spots in the target image are extracted. The specific extraction method is described in the dissertation titled "Unbiased Extraction of Curvilinear Structures from 2D and 3D Images[D] (Technology University Munich, 1998)" and written by Carsten Steger. Then ellipse fitting is performed to points at edges of the circular spots to calculate the centers of the circular spots. The extracted centers of the circular spots are taken as the calibration points, and image coordinates of the calibration points are made to correspond to world coordinates of the calibration point.

Figure 4:
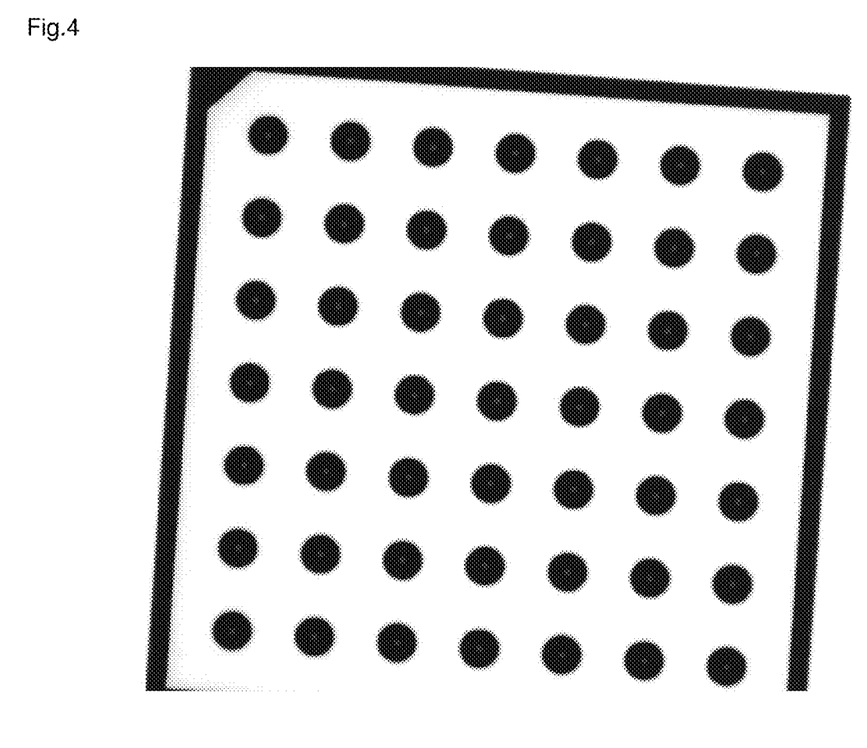
FIG. 4 and FIG. 5 are two images of planar target which are shot from one position by the left and right cameras respectively, the peripheral curves of the circular spots are fitted ellipses and the central points are the detected centers of circular spots.
Figure 5:
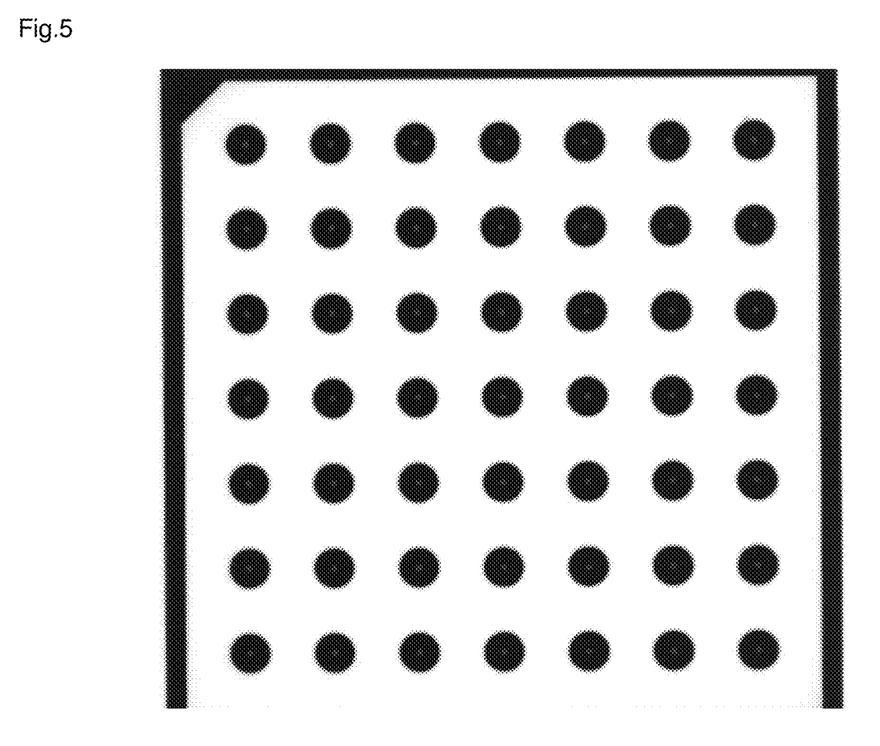

FIG. 4 and FIG. 5 are two images of the planar target which are shot from one position by the left and right cameras respectively, and peripheral curves of the circular spots are the fitted ellipses and the central points are the detected centers of circular spots.

Step 201d: calibrating the parameters of the left and right microscopic vision measurement models respectively.

In this step, the calibrations of the left and right microscopic vision measurement models are similar, so only the calibration of the left microscopic vision measurement model is described below.

Virtual model parameters $d_l$ and $\alpha_l$ are system characteristic parameters, which are not determined by numerical values. $d_l$ in any position has a corresponding $\alpha_l$, $d_l$ and $\alpha_l$ are related to each other and are independent of other parameters, which enables the model to change the nonlinearity of the objective function in the calibration optimization in the process of adaptive positioning of $d_l$ and $\alpha_l$, thus ensuring a precise and stable system calibration.

The calibration of the left microscopic vision measurement model is described as follows.

Step d1: setting an interval $[\alpha_{min}, \alpha_{max}]$ with the system optical magnification as the center, and setting $\alpha_0=\alpha_{min}$, i=1.

Step d2: setting $\alpha_l=\alpha_0$.

Step d3: calculating the closed-form solutions of the remaining intrinsic and extrinsic parameters according to the image coordinates and world coordinates of the extracted calibration points.

Step d4: optimizing the intrinsic and extrinsic parameters for the objective function by minimizing the image reprojection error using Levenberg-Marquardt Algorithm according to the image coordinates and world coordinates of the extracted calibration points in the case where the closed-form solutions are taken as the initial values and $k_{1l}=k_{2l}=0$ is set, and recording the optimization result as the $i^{th}$ result set.

Step d5: setting $\alpha_0=\alpha_0+\Delta\alpha$, wherein $\Delta\alpha$ is step size, if there is $\alpha_0 \in [\alpha_{min}, \alpha_{max}]$, then there is $i=i+1$ and turning to Step d2; otherwise, turning to Step d6.

Step d6: selecting the optimal value of the i result sets to be the calibration result, and ending the calibration.

The nonlinear optimization problem aiming at minimizing the image reprojection error for the objective function is $$\min_{\theta_q} \Delta q^T \Delta q$$

where the vector function $\Delta q$ is a column vector consisting of image reprojection errors generated by all the calibration points, which has a component of $\Delta q=|\hat{q}_{distl}-q_{distl}|_2$. Here, $\hat{q}_{distl}$ is the image coordinates of the calibration points extracted according to Step 201c, and $q_{distl}$ is the distorted image coordinates of the calibration points calculated according to the left microscopic vision measurement model, and there is $\theta_q=\{s_l, u_{0l}, v_{0l}, d_l, k_{1l}, k_{2l}, R_w^{dl}, T_w^{dl}\}$.

Similarly, the right microscopic vision measurement model is calibrated.

Step 201e: optimizing all the calibrated parameters of the microscopic stereo vision measurement model.

In this step, according to the structural relation between the left and right microscopic vision measurement models, the structure parameters of the microscopic stereo vision measurement model can be calculated, then all the parameters of the microscopic stereo vision measurement model are optimized for the objective function by minimizing the error of distance between any two points.

The nonlinear optimization problem aiming at minimizing the error of distance between any two points for the objective function is:

$$\min_{\theta_D} \Delta D^T \Delta D$$

where the vector function $\Delta D$ is a column vector consisting of the error of distance between any two points from all calibration points, which has a component of $\Delta D=|\hat{D}_{ij}-D_{ij}|$, $i \neq j$. Here, $\hat{D}_{ij}$ is the true distance between the $i^{th}$ calibration point and $j^{th}$ calibration point, and $D_{ij}$ is the distance between the $i^{th}$ calibration point and $j^{th}$ calibration point which is calculated based on the microscopic stereo vision measurement model, and there is $\theta_D=\{s_l, u_{0l}, v_{0l}, d_l, k_{1l}, k_{2l}, R_w^{dl}, T_w^{dl}, s_r, u_{0r}, v_{0r}, d_r, k_{1r}, k_{2r}, R, T\}$.

Simulation experiments have been conducted to explain the performance of the method of the disclosure on the microscopic vision measurement.

The microscopic vision measurement model based on adaptive positioning of the camera coordinate frame is compatible with Zhang model (Z. Y. Zhang, "A Flexible New Technique for Camera Calibration[R] (Microsoft Research, NSR-TR-98-71, 1998)"), so the simulation data are generated according to the latter model. Assuming the effective focal length $f_x=58398.3\text{pix}^{-1}$, the image scale factor $s=1.024$, the coordinates of the principal point $[u_0, v_0]^T=[1231,1023]^T$ pix in the Zhang model. The simulation feature points are generated by arbitrarily placing the planar target containing 49 feature points in 5 different positions in the field of view. The noises with the mean of 0 and standard deviation of 0~0.5 are added to the feature points in the 5 positions respectively, and then are used for calibration described in Step 201d. The result for each noise level is obtained by 100 times noise repetition experiments.

Figure 6:
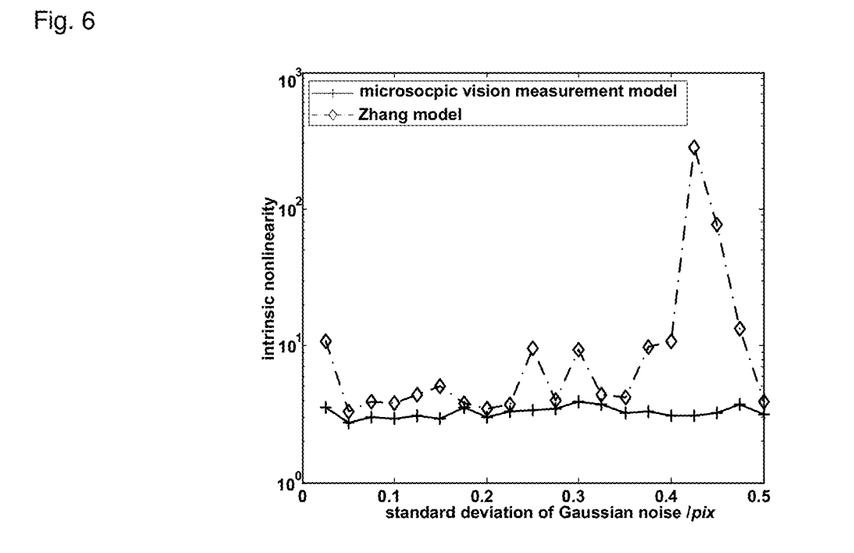
FIG. 6 is a graph illustrating the relationship between the intrinsic nonlinearity of an objective function in calibration optimization and the Gaussian noise level according to both a microscopic vision measurement model based on adaptive positioning of the camera coordinate frame and Zhang model.
Figure 7:
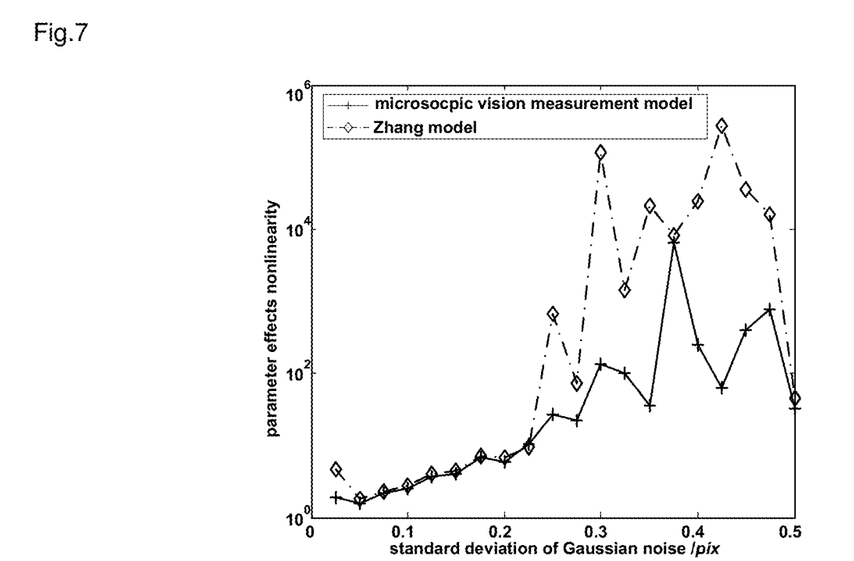
FIG. 7 is a graph illustrating the relationship between the parameter effects nonlinearity of an objective function in calibration optimization and the Gaussian noise level according to both a microscopic vision measurement model based on adaptive positioning of the camera coordinate frame and Zhang model.

FIG. 6 and FIG. 7 are graphs illustrating the relationship between the intrinsic nonlinearity of the objective function in calibration optimization and the Gaussian noise level, and between the parameter effects nonlinearity of the objective function in calibration optimization and the Gaussian noise level according to both the microscopic vision measurement model based on adaptive positioning of the camera coordinate frame and Zhang model. The definition and the calculation of the intrinsic nonlinearity and parameter effects nonlinearity of the objective function are described in detail in the book "Nonlinear regression analysis and its applications, New York: Wiley, 1988", Bates et al. The curves in FIG. 6 and FIG. 7 show that both the intrinsic nonlinearity and the parameter effects nonlinearity based on the microscopic vision measurement model are smaller than that based on Zhang model, it means that the former will be less sensitive to the initial values and will be easier to converge to the global optimum in the procedure of optimization, and in theory, the former will get a better optimization result.

Figure 8:
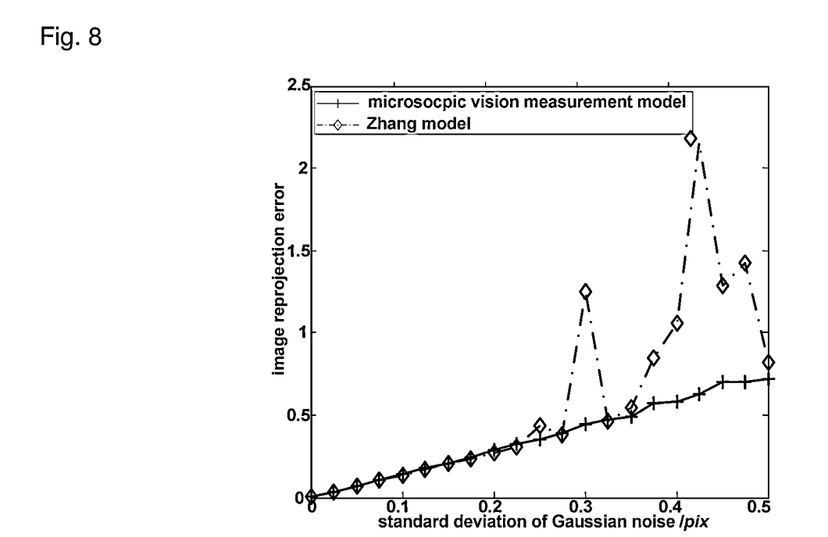
FIG. 8 is a graph illustrating the relationship between the calibration precision and the Gaussian noise level according to both a microscopic vision measurement model based on adaptive positioning of the camera coordinate frame and Zhang model.

FIG. 8 is a graph illustrating the relationship between the calibration precision and the Gaussian noise level according to both the microscopic vision measurement model based on adaptive positioning of the camera coordinate frame and Zhang model. The curves show that the calibration precision of the former is indeed higher than that of the latter.

Figure 9:
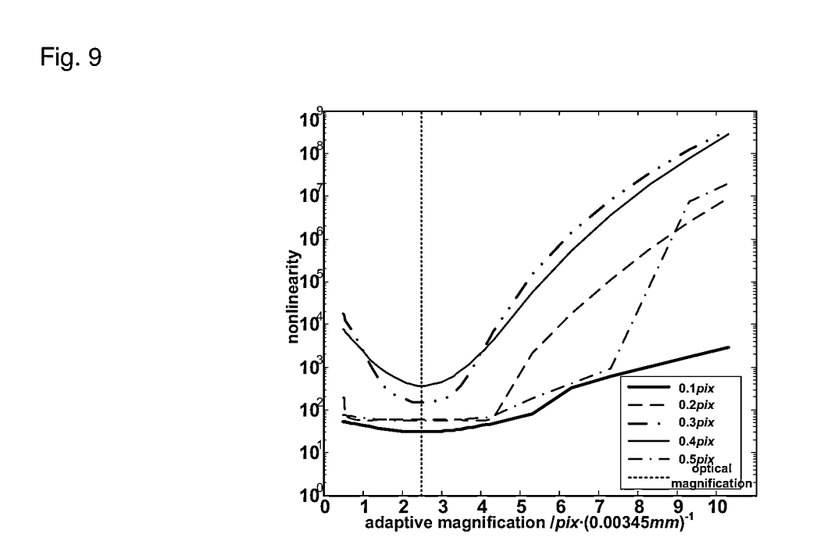
FIG. 9 is a graph illustrating the relationship between the nonlinearity of a microscopic vision measurement model based on adaptive positioning of the camera coordinate frame and the adaptive magnification.

FIG. 9 is a graph illustrating the relationship between the nonlinearity (the square root of root mean square intrinsic curvature and root mean square parameter effects curvature) of the microscopic vision measurement model based on adaptive positioning of the camera coordinate frame and the adaptive magnification. The curves in FIG. 9 show that the smaller nonlinearity is obtained when the adaptive magnification is close to the optical magnification, which explains why the adaptive magnification is limited by a searching interval centered on the optical magnification in Step d1.

Further, precision tests have been conducted to explain the performance of the method of the disclosure on the microscopic vision measurement.

In the test, the microscopic stereo vision measurement system consists of a Zeiss Carl Discovery Stereo V8 microscope and two AVT Stingray F504B cameras. The magnification of the microscopic objective is 1.5×, the magnification of the zoom body is 3.2×, and the magnification of the camera adapter is 0.63×, that is, the system has a nominal magnification of 3.024× from the object space to the image space, with work distance (distance between the work point to the front end of the objective) of 30 mm. The sensor of the camera is ⅔" CCD chip with a pixel resolution of 2452×2056 pixels. A circular spot planar target shown in FIG. 4 and FIG. 5 is used, which has the same distance of 0.3125 mm between the two neighbor circle centers in the vertical and horizontal directions, a radius of 0,078125 mm, and a machining precision of 0.15 μm, and provides a circular spot array of 7×7.

The planar target is moved freely in the narrow depth of field of the microscopic stereo vision measurement system, and left and right cameras shoot 12 pairs of images at 12 positions and extract the image coordinates of the center of the circular spot. All the matched centers of the circle spots extracted from the left and right images are used as calibration points. Then the planar target is moved freely in the narrow depth of field of the microscopic stereo vision measurement system, and left and right cameras shoot 10 pairs of images at 10 positions and extract the image coordinates of the center of the circular spot. All the matched centers of the circle spots extracted from the left and right images are used as check points. The measurement precision is defined as the distance error between the true distance between the two neighbor check points and the distance between the two neighbor check points which is calculated based on the vision measurement model, here, the true distance is 0.3125 mm, which is the distance between the two neighbor circle centers.

Figure 10:
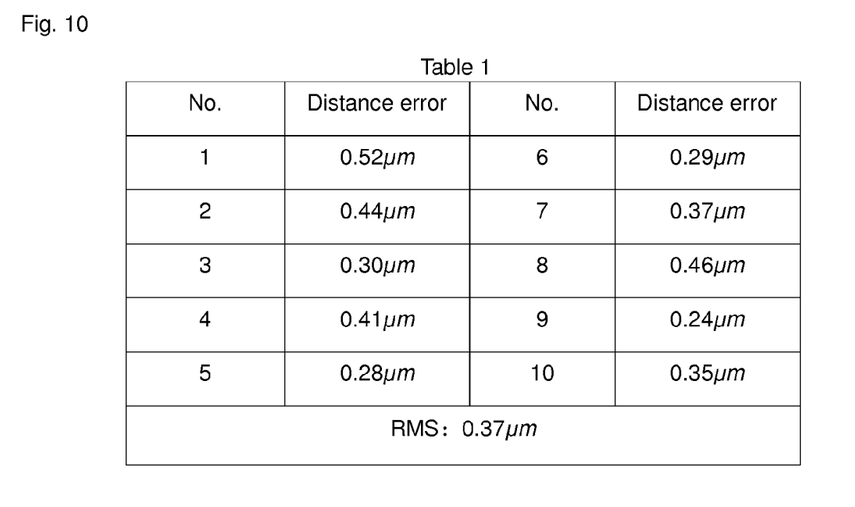
FIG. 10 is a table illustrating the measurement precision calculated from check points after the calibration of a microscopic stereo vision measurement system with calibration points through a microscopic stereo vision measurement model based on adaptive positioning of the camera coordinate frame.

FIG. 10 is a table illustrating the measurement precision calculated from the check points after the calibration of a microscopic stereo vision measurement system with the calibration points through a microscopic stereo vision measurement model based on the adaptive positioning of the camera coordinate frame. From FIG. 10, it can be seen that the microscopic stereo vision system according to the model based on adaptive positioning of the camera coordinate frame achieves a measurement precision of 0.37 μm, that is the relative measurement precision of 0.12%.

Figure 11:
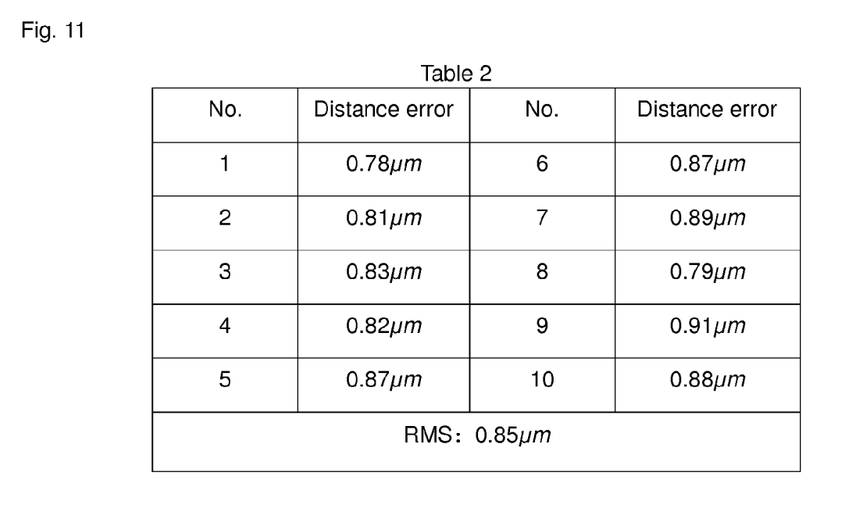
FIG. 11 is a table illustrating the measurement precision calculated from check points after the calibration of a microscopic stereo vision measurement system with calibration points through a conventional binocular vision measurement model.

FIG. 11 is a table illustrating the measurement precision calculated from the check points after the calibration of a microscopic stereo vision measurement system with the calibration points through the conventional binocular vision measurement model (the binocular vision measurement model based on the left and right Zhang model). From FIG. 11, it can be seen that the microscopic stereo vision system based on the conventional binocular vision measurement model only can achieve a measurement precision of 0.85 μm, that is the relative measurement precision of 0.27%. Therefore, the measurement precision of the microscopic vision measurement method based on the adaptive positioning of the camera coordinate frame is twice higher than that of the conventional vision measurement method.

During the measurement, Steps 202-204 are performed.

Step 202: acquiring pairs of synchronical images and transmitting the acquired images to the computer through an image acquisition card.

In the case where a high-quality uniform illumination is provided, pairs of synchronical images are transmitted to the computer through an image acquisition card.

Step 203: calculating 3D coordinates of the feature points in the scene according to the matched pairs of feature points in the scene obtained from the synchronical images and the calibrated parameters of the microscopic stereo vision measurement model.

In this step, the sub-pixel image coordinates of the feature points in the scene are extracted respectively from the left and right camera images. The specific extraction method is similar with the method described in Step 201c. According to the matched pairs of feature points in the scene and the calibrated parameters of the microscopic stereo vision measurement model, 3D coordinates of the feature points in the scene are calculated.

Step 204: performing specific measurement according to the above 3D coordinates of the feature points in the scene.

In this step, according to the specific measurement target, such as 3D geometric size measurement or displacement measurement, the specific measurement is performed based on the above calculated 3D coordinates of the feature points in the scene.

The microscopic stereo vision measurement system provided by the disclosure can be widely applied in the measurement of the tiny geometric size and micro motion parameters.

The above descriptions are only preferred embodiments of the disclosure, which are not used to limit the protection scope of the disclosure.

The invention claimed is:

1. A microscopic vision measurement method based on adaptive positioning of a camera coordinate frame, comprising:

Step A: acquiring pairs of synchronical images and transmitting the acquired images to a computer through an image acquisition card;

Step B: calculating 3D coordinates of feature points in a scene according to the matched pairs of feature points in the scene obtained from the synchronical images and calibrated parameters of a microscopic stereo vision measurement model; and Step C: performing specific measurement according to the 3D coordinates of the feature points in the scene, and the method further comprising: calibrating the microscopic stereo vision measurement model based on adaptive positioning of the camera coordinate frame before executing the Step B, wherein the calibration comprises:

Step a: setting up left and right microscopic vision measurement models by adaptively moving left and right camera coordinate frame along their own optical axes respectively, and establishing structural relation between the left and right microscopic vision measurement models;

Step b: placing a planar target randomly in at least three positions in measurement space, shooting the planar target by left and right cameras to get pairs of target images, and setting up a world coordinate frame according to position of the planar target;

Step c: extracting coordinates of calibration points in the target images;

Step d: calibrating parameters of the left and right microscopic vision measurement models respectively;

Step e: optimizing all the calibrated parameters of the microscopic stereo vision measurement model, wherein the Step a further comprises:

assuming $o_{cl}$ is an optical center of a left microscopic vision system and a left optical axis and a left camera image plane $\pi_{ul}$ intersect at a principal point $o_{pl}$, setting up a 2D left image coordinate frame $o_l$–$u_l v_l$ with a top left point on $\pi_{ul}$ as its origin, and setting up a left camera right-handed coordinate frame $o_{dl}$–$x_{dl} y_{dl} z_{dl}$ with $o_{dl}$ in the left optical axis as its origin, $o_{dl} x_{dl}//o_l u_l$, $o_{dl} y_{dl}//o_l v_l$ and $o_{cl} o_{dl}$=$d_l$; assuming $o_{cr}$ is an optical center of a right microscopic vision system and a right optical axis and a right camera image plane $\pi_{ur}$ intersect at a principal point $o_{pr}$, setting up a 2D right image coordinate frame $o_r$–$u_r v_r$ with a top left point on $\pi_{ur}$ as its origin, and setting up a right camera right-handed coordinate frame $o_{dr}$–$x_{dr} y_{dr} z_{dr}$ with $o_{dr}$ in the right optical axis as its origin, $o_{dr} x_{dr}//o_r u_r$, $o_{dr} y_{dr}//o_r v_r$ and $o_{cr} o_{dr}$=$d_r$; and assuming $o_w$–$x_w y_w z_w$ is the world coordinate frame;

assuming a 3D point Q has coordinates of $X_w$=$[x_w, y_w, z_w, 1]^T$ in the world coordinate frame, coordinates of $X_{dl}$=$[x_{dl}, y_{dl}, z_{dl}]^T$ in the left camera coordinate frame and coordinates of $X_{dr}$=$[x_{dr}, y_{dr}, z_{dr}]^T$ in the right camera coordinate frame, then transformations among the coordinates are expressed as follows: $X_{dl}$=$R_w^{dl} X_w + T_w^{dl}$, $X_{dr}$=$R_w^{dr} X_w + T_w^{dr}$ and $X_{dr}$=$RX_{dl}+T$, wherein $R_w^{dl}$ and $T_w^{dl}$ are a 3×3 rotation matrix and a 3×1 translation vector in the transformation from $o_w$–$x_w y_w z_w$ to $o_{dl}$–$x_{dl} y_{dl} z_{dl}$, $R_w^{dr}$ and $T_w^{dr}$ are a 3×3 rotation matrix and a 3×1 translation vector in the transformation from $o_w$–$x_w y_w z_w$ to $o_{dr}$–$x_{dr} y_{dr} z_{dr}$, R and T are a 3×3 rotation matrix and a 3×1 translation vector in the transformation from $o_{dl}$-$x_{dl}y_{dl}z_{dl}$ to $o_{dr}$-$x_{dr}y_{dr}z_{dr}$, and R and T are structure parameters of the microscopic stereo vision measurement model;

assuming image coordinates of left and right light path image points $q_l$ and $q_r$ of the 3D point Q are $[u_l,v_l]^T$ and $[u_r,v_r]^T$ respectively, then an ideal projection transformation of the microscopic stereo vision measurement model based on adaptive positioning of a camera coordinate frame is as follows:

$$\xi_l \begin{bmatrix} u_l \\ v_l \\ 1 \end{bmatrix} = \begin{bmatrix} s_l\alpha_l & 0 & u_{0l}/d_l & u_{0l} \\ 0 & \alpha_l & v_{0l}/d_l & v_{0l} \\ 0 & 0 & 1/d_l & 1 \end{bmatrix} \begin{bmatrix} x_{dl} \\ y_{dl} \\ z_{dl} \\ 1 \end{bmatrix};$$

$$\xi_r \begin{bmatrix} u_r \\ v_r \\ 1 \end{bmatrix} = \begin{bmatrix} s_r\alpha_r & 0 & u_{0r}/d_r & u_{0r} \\ 0 & \alpha_r & v_{0r}/d_r & v_{0r} \\ 0 & 0 & 1/d_r & 1 \end{bmatrix} \begin{bmatrix} x_{dr} \\ y_{dr} \\ z_{dr} \\ 1 \end{bmatrix};$$

where $\xi_l$ and $\xi_r$ are proportionality coefficients, $s_l$ and $s_r$ are left and right camera image scale factors respectively, $[u_{0l}, v_{0l}]^T$ and $[u_{0r}, v_{0r}]^T$ are coordinates of the principal points of left and right cameras respectively, $d_l$ and $d_r$ are positioning offsets of the left and right camera coordinate frames respectively, $\alpha_l$ and $\alpha_r$ are left and right adaptive magnifications respectively;

considering primary and secondary radial distortions of lens, and assuming coordinates of actual image points $q_{distl}$ and $q_{distr}$ corresponding to ideal points $q_l$ and $q_r$ are $[u_{distl}, v_{distl}]^T$ and $[u_{distr}, v_{distr}]^T$, then transformation from ideal image coordinates to actual image coordinates is as follows:

$$\begin{cases} u_{distl} = (u_l - u_{0l})(1 + k_{1l}r_l^2 + k_{2l}r_l^4) + u_{0l} \\ v_{distl} = (v_l - v_{0l})(1 + k_{1l}r_l^2 + k_{2l}r_l^4) + v_{0l}; \end{cases}$$

$$\begin{cases} u_{distr} = (u_r - u_{0r})(1 + k_{1r}r_r^2 + k_{2r}r_r^4) + u_{0r} \\ v_{distr} = (v_r - v_{0r})(1 + k_{1r}r_r^2 + k_{2r}r_r^4) + v_{0r} \end{cases}$$

where $r_l^2=(u_l-u_{0l})^2+(v_l-v_{0l})^2$, $r_r^2=(u_r-u_{0r})^2+(v_r-v_{0r})^2$, $k_{1l}$, $k_{2l}$ and $k_{1r}$, $k_{2r}$ are primary and secondary radial distortion coefficients of left and right cameras respectively;

in summary, parameters of the established microscopic stereo vision measurement model based on adaptive positioning of the camera coordinate frame comprises:
intrinsic parameters: $s_l$, $s_r$, $[u_{0l}, v_{0l}]^T$, $[u_{0r}, v_{0r}]^T$, $d_l$, $d_r$, $\alpha_l$, $\alpha_r$, $k_{1l}$, $k_{2l}$, $k_{1r}$, $k_{2r}$;
structure parameters: R, T;
extrinsic parameters: $R_w^{dl}$, $T_w^{dl}$.

2. The method according to claim 1, wherein the Step b further comprises:

setting a planar target with a preset array of black circular spots, wherein a total number of circular spots is 40~100, a radius of the circular spot is 0.01~0.08 mm, vertical and horizontal spacing is 0.01~0.5 mm, a positioning precision is 0.15~3 μm, and a center of the circular spot is taken as the calibration point;

moving the planar target at least three positions non-horizontally in a field of view with narrow depth of field, and shooting the planar target by left and right cameras respectively at each position to get pairs of target images;

setting up the world coordinate frame $o_w$-$x_wy_wz_w$ with $o_w$-$x_wy_w$ on the target plane, and obtaining world coordinates of all the calibration points.

3. The method according to claim 2, wherein the Step c further comprises:

extracting sub-pixel image coordinates of points at edges of the circular spots in the target image, then performing ellipse fitting to points at edges of the circular spots to calculate the centers of the circular spots, taking the extracted centers of the circular spots as the calibration points, and making image coordinates of the calibration points correspond to world coordinates of the calibration points.

4. The method according to claim 3, wherein calibrating parameters of the left microscopic vision measurement model in the Step d comprises:

Step d1: setting an interval $[\alpha_{min}, \alpha_{max}]$ with system optical magnification as the center, and setting $\alpha_0=\alpha_{min}$, i=1;

Step d2: setting $\alpha_l=\alpha_0$;

Step d3: calculating closed-form solutions of remaining intrinsic and extrinsic parameters according to image coordinates and world coordinates of the extracted calibration points;

Step d4: optimizing intrinsic and extrinsic parameters for an objective function by minimizing an image reprojection error using Levenberg-Marquardt Algorithm according to the image coordinates and world coordinates of the extracted calibration points in the case where the close-form solutions are taken as initial values and $k_{1l}=k_{2l}=0$ is set, and recording optimization result as the $i^{th}$ result set;

Step d5: setting $\alpha_0=\alpha_0+\Delta\alpha$, wherein $\Delta\alpha$ is step size, if there is $\alpha_0\in[\alpha_{min}, \alpha_{max}]$, then there is i=i+1, and turning to Step d2; otherwise, turning to Step d6;

Step d6: selecting an optimal value of i result sets to be a calibration result, and ending the calibration;

the nonlinear optimization problem aiming at minimizing the image reprojection error for the objective function is $$\min_{\theta_D} \Delta D^T \Delta D$$

where the vector function $\Delta q$ is a column vector consisting of image reprojection errors generated by all the calibration points, which has a component of $\Delta q=|\hat{q}_{distl}-q_{distl}|_2$, here, $\hat{q}_{distl}$ is the image coordinates of the calibration points extracted according to the Step c, and $q_{distl}$ is distorted image coordinates of the calibration points calculated according to the left microscopic vision measurement model, and there is $\theta_q\{s_l, u_{0l}, v_{0l}, d_l, k_{1l}, k_{2l}, R_w^{dl}, T_w^{dl}\}$.

5. The method according to claim 4, wherein the Step e further comprises:

calculating the structure parameters of the microscopic stereo vision measurement model according to the structural relation between the left and right microscopic vision measurement models, then optimizing all the parameters for the objective function by minimizing an error of distance between any two points;

the nonlinear optimization problem aiming at minimizing the error of distance between any two points for the objective function is $$\min_{\theta_q} \Delta q^T \Delta q$$

where the vector function $\Delta D$ is a column vector consisting of an error of distance between any two points from all calibration points, which has a component of $\Delta D = |\hat{D}_{ij} - D_{ij}|$, $i \neq j$, here, $\hat{D}_{ij}$ is a true distance between the $i^{th}$ calibration point and $j^{th}$ calibration point, and $D_{ij}$ is the distance between the $i^{th}$ calibration point and $j^{th}$ calibration point which is calculated based on the microscopic stereo vision measurement model, and there is $\theta_D = \{s_l, u_{0l}, v_{0l}, d_l, k_{1l}, k_{2l}, R_w^{dl}, T_w^{dl}, s_r, u_{0r}, v_{0r}, d_r, k_{1r}, k_{2r}, R, T\}$.

* * * * *